(12) United States Patent
Carrette

(10) Patent No.: US 10,399,070 B2
(45) Date of Patent: Sep. 3, 2019

(54) CATALYST CONTAINING γ-VALEROLACTONE AND/OR THE HYDROLYSIS PRODUCTS THEREOF, AND USE THEREOF IN A HYDROPROCESSING AND/OR HYDROCRACKING METHOD

(71) Applicant: IFP Energies nouvelles, Rueil-Malmaison (FR)

(72) Inventor: Pierre-Louis Carrette, Lyons (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 15/570,661

(22) PCT Filed: Mar. 11, 2016

(86) PCT No.: PCT/EP2016/055326
§ 371 (c)(1),
(2) Date: Oct. 30, 2017

(87) PCT Pub. No.: WO2016/173759
PCT Pub. Date: Nov. 3, 2016

(65) Prior Publication Data
US 2018/0290131 A1 Oct. 11, 2018

(30) Foreign Application Priority Data
Apr. 30, 2015 (FR) .................................. 15 53914

(51) Int. Cl.
| | | |
|---|---|---|
| *B01J 31/02* | (2006.01) | |
| *B01J 37/08* | (2006.01) | |
| *C10G 45/04* | (2006.01) | |
| *B01J 37/02* | (2006.01) | |
| *B01J 31/04* | (2006.01) | |
| *C10G 45/08* | (2006.01) | |
| *C10G 47/20* | (2006.01) | |
| *B01J 23/85* | (2006.01) | |
| *B01J 27/19* | (2006.01) | |
| *B01J 21/04* | (2006.01) | |
| *B01J 23/882* | (2006.01) | |
| *B01J 37/20* | (2006.01) | |
| *B01J 37/28* | (2006.01) | |
| *B01J 35/10* | (2006.01) | |
| *B01J 37/00* | (2006.01) | |

(52) U.S. Cl.
CPC .......... *B01J 31/0209* (2013.01); *B01J 21/04* (2013.01); *B01J 23/85* (2013.01); *B01J 27/19* (2013.01); *B01J 31/04* (2013.01); *B01J 37/0201* (2013.01); *B01J 37/0203* (2013.01); *B01J 37/024* (2013.01); *B01J 37/0205* (2013.01); *B01J 37/0236* (2013.01); *B01J 37/08* (2013.01); *C10G 45/08* (2013.01); *C10G 47/20* (2013.01); *B01J 23/882* (2013.01); *B01J 35/1019* (2013.01); *B01J 35/1042* (2013.01); *B01J 35/1061* (2013.01); *B01J 37/0009* (2013.01); *B01J 37/20* (2013.01); *B01J 37/28* (2013.01); *B01J 2523/00* (2013.01)

(58) Field of Classification Search
CPC ........ B01J 31/02; B01J 21/04; B01J 37/0204; B01J 37/0236; B01J 27/19; B01J 37/0201; B01J 37/0205; C10G 45/08
See application file for complete search history.

(56) References Cited

U.S. PATENT DOCUMENTS

| | | |
|---|---|---|
| 5,232,888 A | 8/1993 | Kamo |
| 2007/0213564 A1* | 9/2007 | Yang .................. B01J 23/28 568/70 |
| 2014/0305842 A1 | 10/2014 | Kraus |

FOREIGN PATENT DOCUMENTS

| | | |
|---|---|---|
| EP | 482817 A1 | 4/1992 |
| WO | 2005035691 A1 | 4/2005 |

OTHER PUBLICATIONS

International Search Report PCT/EP2016/055326 dated May 24, 2016.

\* cited by examiner

*Primary Examiner* — Renee Robinson
*Assistant Examiner* — Derek N Mueller
(74) *Attorney, Agent, or Firm* — Millen, White, Zelano and Branigan, P.C.

(57) ABSTRACT

The invention relates to a catalyst comprising a support based on alumina or silica or silica-alumina, at least one element of group VIII, at least one element of group VIB and at least one additive selected from γ-valerolactone, 4-hydroxyvaleric acid, 2-pentenoic acid, 3-pentenoic acid or 4-pentenoic acid. The invention also relates to the process for the preparation of said catalyst and the use thereof in a hydrotreatment and/or hydrocracking process.

17 Claims, No Drawings

CATALYST CONTAINING γ-VALEROLACTONE AND/OR THE HYDROLYSIS PRODUCTS THEREOF, AND USE THEREOF IN A HYDROPROCESSING AND/OR HYDROCRACKING METHOD

The invention relates to a catalyst with the additives γ-valerolactone, 4-hydroxyvaleric acid, 2-pentenoic acid, 3-pentenoic acid and/or 4-pentenoic acid, the method for the preparation thereof and the use thereof in the field of hydrotreatment and/or hydrocracking.

A catalyst for the hydrotreatment of hydrocarbon-containing cuts usually has the aim of removing the sulphur-containing or nitrogen-containing compounds contained therein so that for example a petroleum product meets the required specifications (sulphur content, aromatics content etc.) for a given application (motor fuel, gasoline or gasoil, domestic fuel oil, jet fuel). It may also be a question of pre-treating this feedstock in order to remove impurities from it or to hydrogenate it before subjecting it to various conversion processes for modifying its physicochemical properties, such as for example processes of reforming, hydrocracking of vacuum distillates, catalytic cracking, hydroconversion of atmospheric or vacuum residues. The composition and the use of hydrotreatment catalysts are described particularly well in the article by B. S. Clausen, H. T. Topsøe, and F. E. Massoth, from the work Catalysis Science and Technology, volume 11 (1996), Springer-Verlag.

Stricter vehicle pollution standards in the European Community (Official Journal of the European Union, L76, 22 Mar. 2003, Directive 2003/70/CE, pages L76/10-L76/19) have compelled refiners to dramatically reduce the sulphur content of diesel fuels and gasolines (to a maximum of 10 parts per million by weight (ppm) of sulphur on 1 Jan. 2009, against 50 ppm on 1 Jan. 2005). Moreover, the refiners are compelled to use feedstocks that are more and more refractory to hydrotreatment processes on the one hand because the crude oils are becoming increasingly heavy and consequently contain an increasing amount of impurities, and on the other hand owing to the increasing use of conversion processes in refineries. In fact, these generate cuts that are more difficult to hydrotreat than the cuts originating directly from atmospheric distillation. By "more difficult to hydrotreat" is usually meant higher operating temperatures to achieve the same sulphur content in the effluent, and consequently cycle times that can be reduced.

These feedstocks require catalysts having hydrodesulphurizing and hydrogenating functions that are greatly improved with respect to conventional catalysts.

Moreover, conversion processes such as catalytic cracking or hydrocracking use catalysts having an acid function, which makes them particularly sensitive to the presence of nitrogen-containing impurities, and especially basic nitrogen-containing compounds. It is therefore necessary to use catalysts for pre-treatment of these feedstocks so as to remove these compounds.

Conventional hydrotreatment catalysts generally comprise an oxide support and an active phase based on metals of groups VIB and VIII in their oxide forms, as well as phosphorus. Preparation of these catalysts generally comprises a step of impregnation of the metals and of the phosphorus on the support, followed by drying and calcination making it possible to obtain the active phase in their oxide forms. Before they are used in a hydrotreatment and/or hydrocracking reaction, these catalysts are generally subjected to sulphurization in order to form the active species.

The addition of an organic compound to hydrotreatment catalysts in order to improve their activity has been recommended by a person skilled in the art, in particular for catalysts that have been prepared by impregnation followed by drying without subsequent calcination. These catalysts are often called "additive-impregnated dried catalysts".

Many documents describe the use of various ranges of organic compounds as additives, such as nitrogen-containing organic compounds and/or oxygen-containing organic compounds.

A family of compounds that is now well known from the literature is the chelating nitrogen-containing compounds (EP0181035, EP1043069 and U.S. Pat. No. 6,540,908) with, by way of example, ethylenediaminetetraacetic acid (EDTA), ethylenediamine, diethylenetriamine or nitrilotriacetic acid (NTA).

In the family of organic compounds containing oxygen, the use of mono-, di- or polyols, optionally etherified, is described in documents WO96/41848, WO01/76741, U.S. Pat. Nos. 4,012,340, 3,954,673, EP601722, and WO2005/035691. More rarely, the prior art mentions additives comprising ester functions (EP1046424, WO2006/077326).

There are also several patents that claim the use of carboxylic acids (EP1402948, EP0482817). In particular, in document EP0482817, citric acid, but also tartaric, butyric, hydroxyhexanoic, malic, gluconic, glyceric, glycolic, hydroxybutyric acids have been described. The specificity is based on the drying, which must be carried out at a temperature of less than 200° C.

Document US2014/0305842 describes the use of heterocyclic compounds containing oxygen or nitrogen in the ring, such as lactams, oxacycloalkanes or lactones. In particular with regard to lactones, this document mentions β-propriolactone, γ-butyrolactone and δ-valerolactone.

However, none of the documents relating to the additives describes the use of γ-valerolactone, or even of 4-hydroxyvaleric acid or 2-pentenoic acid, 3-pentenoic acid or 4-pentenoic acid, which may be obtained directly or indirectly by hydrolysis of γ-valerolactone.

Whatever compounds are selected, the modifications induced do not always make it possible to increase catalyst performance sufficiently to meet the specifications relating to the sulphur and/or nitrogen contents of motor fuels. Moreover, it is often very complicated to apply them industrially, as the methods are complex to implement.

Consequently, it proves to be essential for catalyst manufacturers to find new hydrotreatment and/or hydrocracking catalysts with improved performance.

SUMMARY

The invention relates to a catalyst comprising a support based on alumina or silica or silica-alumina, at least one element of group VIII, at least one element of group VIB and at least one additive selected from γ-valerolactone, 4-hydroxyvaleric acid, 2-pentenoic acid, 3-pentenoic acid or 4-pentenoic acid.

The applicant in fact found that the use of at least one additive selected from γ-valerolactone, 4-hydroxyvaleric acid, 2-pentenoic acid, 3-pentenoic acid or 4-pentenoic acid as organic additive(s) on a catalyst containing at least one element of group VIII and at least one element of group VIB allowed a hydrotreatment and/or hydrocracking catalyst with improved catalytic performance to be obtained.

In fact, the catalyst according to the invention shows increased activity with respect to the catalysts without additives and to the known dried catalysts with additives.

Typically, owing to the increase in activity, the temperature required to reach a desired sulphur or nitrogen content (for example 10 ppm of sulphur in the case of a gasoil feedstock, in ULSD or Ultra Low Sulphur Diesel mode) may be lowered. Moreover, stability is increased, as the cycle time is prolonged due to the decrease in the required temperature.

The catalyst according to the present invention is moreover easy to prepare due to the high solubility of γ-valerolactone, 4-hydroxyvaleric acid, 2-pentenoic acid, 3-pentenoic acid and 4-pentenoic acid in water or any other polar protic solvent.

Furthermore, the catalyst according to the invention may be prepared from a raw material originating from biomass preferably containing predominantly γ-valerolactone (J-C. Serrano-Ruiz in Green Chem., 2010, 12, 574-577, or W. R. H. Wright and R. Palkovits in ChemSusChem 2012, 5, 9, 1657-1667) while remaining at an acceptable cost price.

According to a variant, the content of an element of group VIB is between 5 and 40% by weight expressed as oxide of a metal of group VIB with respect to the total weight of the catalyst, and the content of an element of group VIII is comprised between 1 and 10% by weight expressed as oxide of a metal of group VIII with respect to the total weight of the catalyst.

According to a variant, the molar ratio of the element of group VIII to the element of group VIB in the catalyst is comprised between 0.1 and 0.8.

According to a variant, the catalyst additionally contains phosphorus, the phosphorus content being comprised between 0.1 and 20% by weight expressed as $P_2O_5$ with respect to the total weight of the catalyst and the ratio of phosphorus to the element of group VIB in the catalyst is greater than or equal to 0.05.

According to a variant, the total content of additive(s) selected from γ-valerolactone, 4-hydroxyvaleric acid, 2-pentenoic acid, 3-pentenoic acid or 4-pentenoic acid is comprised between 1 and 35% by weight with respect to the total weight of the catalyst.

According to a variant, the catalyst additionally contains an organic compound other than the additive selected from γ-valerolactone, 4-hydroxyvaleric acid, 2-pentenoic acid, 3-pentenoic acid or 4-pentenoic acid, said organic compound containing oxygen and/or nitrogen and/or sulphur. According to this variant, the organic compound is preferably selected from a compound comprising one or more chemical functions selected from a carboxyl, alcohol, thiol, thioether, sulphone, sulphoxide, ether, aldehyde, ketone, ester, carbonate, amine, nitrile, imide, oxime, urea and amide function. Preferably, it is selected from triethylene glycol, diethylene glycol, ethylenediaminetetraacetic acid (EDTA), maleic acid, citric acid, dimethylformamide, bicine, or tricine.

According to a variant, the support contains from 0.1 to 50% by weight of zeolite.

According to a variant, the catalyst is at least partially sulphurized.

The invention also relates to the process for the preparation of said catalyst comprising the following steps:
   a) bringing at least one component of an element of group VIB, at least one component of an element of group VIII, at least one additive selected from γ-valerolactone, 4-hydroxyvaleric acid, 2-pentenoic acid, 3-pentenoic acid or 4-pentenoic acid and optionally phosphorus into contact with a support based on alumina or silica or silica-alumina, or bringing a regenerated catalyst containing a support based on alumina or silica or silica-alumina, at least one component of an element of group VIB, at least one component of an element of group VIII and optionally phosphorus into contact with at least one additive selected from γ-valerolactone, 4-hydroxyvaleric acid, 2-pentenoic acid, 3-pentenoic acid or 4-pentenoic acid, so as to obtain a catalyst precursor,
   b) drying said catalyst precursor originating from step a) at a temperature of less than 200° C., without calcining it subsequently.

According to a variant, step a) is the following step:
   a') impregnating a support based on alumina or silica or silica-alumina with at least one solution containing at least one element of group VIB, at least one element of group VIII, at least one additive selected from γ-valerolactone, 4-hydroxyvaleric acid, 2-pentenoic acid, 3-pentenoic acid or 4-pentenoic acid and optionally phosphorus so as to obtain a catalyst precursor.

According to another variant, step a) comprises the following steps:
   a1) impregnating a support based on alumina or silica or silica-alumina with at least one solution containing at least one element of group VIB, at least one element of group VIII and optionally phosphorus in order to obtain an impregnated support,
   a2) drying the impregnated support obtained in step a1) at a temperature of less than 200° C. in order to obtain a dried impregnated support, and optionally calcining the dried impregnated support in order to obtain a calcined impregnated support,
   a3) impregnating the dried and optionally calcined impregnated support obtained in step a2) with an impregnating solution comprising at least one additive selected from γ-valerolactone, 4-hydroxyvaleric acid, 2-pentenoic acid, 3-pentenoic acid or 4-pentenoic acid so as to obtain a catalyst precursor,
   a4) optionally, leaving the catalyst precursor obtained in step a3) to mature.

According to another variant, step a) comprises the following steps:
   a1') preparing a support comprising at least one additive selected from γ-valerolactone, 4-hydroxyvaleric acid, 2-pentenoic acid, 3-pentenoic acid or 4-pentenoic acid and optionally at least one part of phosphorus,
   a2') impregnating the support obtained in step a1') with an impregnating solution comprising at least one element of group VIB, at least one element of group VIII and optionally phosphorus so as to obtain a catalyst precursor,
   a3') optionally, leaving the catalyst precursor obtained in step a2') to mature.

According to another variant, step a) comprises the following steps:
   a1") by co-impregnation, bringing a solution containing at least one element of group VIB, at least one element of group VIII, at least one organic compound containing oxygen and/or nitrogen and/or sulphur, and optionally phosphorus into contact with a support based on alumina or silica or silica-alumina so as to obtain an impregnated support,
   a2") drying the impregnated support originating from step a1") at a temperature of less than 200° C., without calcining it subsequently, in order to obtain a dried impregnated support,
   a3") bringing the dried impregnated support originating from step a2") into contact with a solution of an organic compound containing oxygen and/or nitrogen and/or sulphur, identical to or different from that used in step a1") so as to obtain a catalyst precursor, a4") optionally, leaving the catalyst precursor obtained in step a3") to mature, and at least one of the organic compounds in step a1") or in step a3") is selected from γ-valerolactone, 4-hydroxyvaleric acid, 2-pentenoic acid, 3-pentenoic acid or 4-pentenoic acid.

According to a variant, when it is desired to prepare the catalyst according to the invention starting from a regenerated catalyst, step a) of the preparation process comprises the following steps:

a1''') impregnating a regenerated catalyst containing a support based on alumina or silica or silica-alumina, at least one component of an element of group VIB, at least one component of an element of group VIII and optionally phosphorus with an impregnating solution comprising at least one additive selected from γ-valerolactone, 4-hydroxyvaleric acid, 2-pentenoic acid, 3-pentenoic acid or 4-pentenoic acid so as to obtain a catalyst precursor, a2''') optionally, leaving the catalyst precursor obtained in step a1''') to mature.

According to a variant, the total molar ratio of the additive(s) selected from γ-valerolactone, 4-hydroxyvaleric acid, 2-pentenoic acid, 3-pentenoic acid or 4-pentenoic acid per element(s) of group VIII is comprised between 0.1 and 5.0 mol/mol.

The invention also relates to the use of the catalyst according to the invention or prepared by the preparation process according to the invention in a process for hydrotreatment and/or hydrocracking of hydrocarbon-containing cuts.

Hereinafter, the groups of chemical elements are given according to the CAS classification (CRC Handbook of Chemistry and Physics, publisher CRC Press, chief editor D. R. Lide, 81st edition, 2000-2001). For example, group VIII according to the CAS classification corresponds to the metals of columns 8, 9 and 10 according to the new IUPAC classification.

By "hydrotreatment" is meant reactions including in particular hydrodesulphurization (HDS), hydrodenitrogenation (HDN) and hydrogenation of aromatics (HDA).

DETAILED DESCRIPTION OF THE INVENTION

Catalyst

The catalyst according to the invention is an additive catalyst containing at least one additive selected from γ-valerolactone, 4-hydroxyvaleric acid, 2-pentenoic acid, 3-pentenoic acid or 4-pentenoic acid. More particularly, the catalyst according to the invention comprises a support based on alumina or silica or silica-alumina, at least one element of group VIII, at least one element of group VIB and at least one additive selected from γ-valerolactone, 4-hydroxyvaleric acid, 2-pentenoic acid, 3-pentenoic acid or 4-pentenoic acid.

The catalyst according to the invention may be a fresh catalyst, i.e. a catalyst that has not been used previously as a catalyst in a catalytic unit and in particular in hydrotreatment and/or hydrocracking.

The catalyst according to the invention may also be a rejuvenated catalyst. By rejuvenated catalyst is meant a catalyst that has been used as a catalyst in a catalytic unit and in particular in hydrotreatment and/or hydrocracking and that has undergone at least one step of calcination in order to burn off the coke (regeneration). Then at least one additive selected from γ-valerolactone, 4-hydroxyvaleric acid, 2-pentenoic acid, 3-pentenoic acid or 4-pentenoic acid is added to this regenerated catalyst in order to obtain the rejuvenated catalyst. This rejuvenated catalyst may contain one or more other organic additive(s) which may be added before, after or at the same time as the additive or additives selected from γ-valerolactone, 4-hydroxyvaleric acid, 2-pentenoic acid, 3-pentenoic acid or 4-pentenoic acid.

The hydrogenating function of said catalyst, also called the active phase, is ensured by at least one element of group VIB and at least one element of group VIII.

The preferred elements of group VIB are molybdenum and tungsten. The preferred elements of group VIII are non-noble elements and in particular cobalt and nickel.

Advantageously, the hydrogenating function is selected from the group comprising combinations of the elements cobalt-molybdenum, nickel-molybdenum, nickel-tungsten or nickel-cobalt-molybdenum, or nickel-molybdenum-tungsten.

In the case where a high activity in hydrodesulphurization, or in hydrodenitrogenation and in hydrogenation of aromatics is desired, the hydrogenating function is advantageously provided by the combination of nickel and molybdenum; a combination of nickel and tungsten in the presence of molybdenum may also be advantageous. In the case of feedstocks of the vacuum distillate type or heavier feedstocks, combinations of the cobalt-nickel-molybdenum type may advantageously be used.

The total content of elements of group VIB and group VIII is advantageously greater than 6% by weight expressed as oxide with respect to the total weight of the catalyst.

The content of an element of group VIB is comprised between 5 and 40% by weight, preferably between 8 and 35% by weight, and more preferably between 10 and 30% by weight expressed as oxide of a metal of group VIB with respect to the total weight of the catalyst.

The content of an element of group VIII is comprised between 1 and 10% by weight, preferably between 1.5 and 9% by weight, and more preferably between 2 and 8% by weight expressed as oxide of a metal of group VIII with respect to the total weight of the catalyst.

The molar ratio of an element of group VIII to an element of group VIB in the catalyst is preferably comprised between 0.1 and 0.8, preferably comprised between 0.15 and 0.6 and even more preferably comprised between 0.2 and 0.5.

The catalyst according to the invention advantageously also comprises phosphorus as a dopant. A dopant is an element that is added, which in itself does not have any catalytic character but which increases the catalytic activity of the active phase.

The phosphorus content in said catalyst is preferably comprised between 0.1 and 20% by weight expressed as $P_2O_5$, preferably between 0.2 and 15% by weight expressed as $P_2O_5$, and very preferably between 0.3 and 10% by weight expressed as $P_2O_5$.

The molar ratio of phosphorus to the element of group VIB in the catalyst is greater than or equal to 0.05, preferably greater than or equal to 0.07, preferably comprised between 0.08 and 1, preferably comprised between 0.08 and 0.7 and very preferably comprised between 0.08 and 0.5.

The catalyst according to the invention may advantageously further contain at least one dopant selected from boron, fluorine and a mixture of boron and fluorine.

When the catalyst contains boron, the boron content is preferably comprised between 0.1 and 10% by weight expressed as boron oxide, preferably between 0.2 and 7% by weight, and very preferably comprised between 0.2 and 5% by weight.

When the catalyst contains fluorine, the fluorine content is preferably comprised between 0.1 and 10% by weight expressed as fluorine, preferably between 0.2 and 7% by weight, and very preferably comprised between 0.2 and 5% by weight.

When the catalyst contains boron and fluorine, the total content of boron and fluorine is preferably comprised between 0.1 and 10% by weight expressed as boron oxide and fluorine, preferably between 0.2 and 7% by weight, and very preferably comprised between 0.2 and 5% by weight.

The catalyst according to the invention comprises a support based on alumina or silica or silica-alumina.

When the support of said catalyst is based on alumina, it contains more than 50% of alumina, and generally it contains only alumina or silica-alumina as defined below.

Preferably, the support comprises alumina, and preferably extruded alumina.

Preferably, the alumina is gamma alumina.

The alumina support advantageously has a total pore volume comprised between 0.1 and 1.5 $cm^3 \cdot g^{-1}$, preferably between 0.4 and 1.1 $cm^3 \cdot g^{-1}$. The total pore volume is measured by mercury porosimetry according to standard ASTM D4284 with a wetting angle of 140°, as described in the work by Rouquerol F.; Rouquerol J.; Singh K. "Adsorption by Powders & Porous Solids: Principle, methodology and applications", Academic Press, 1999, for example by means of the model Autopore III™ apparatus with the trade mark Micromeritics™.

The specific surface area of the alumina support is advantageously comprised between 5 and 400 $m^2 \cdot g^{-1}$, preferably between 10 and 350 $m^2 \cdot g^{-1}$, more preferably between 40 and 350 $m^2 \cdot g^{-1}$. The specific surface area is determined in the present invention by the BET method according to standard ASTM D3663; this method is described in the same work cited above.

In another preferred case, the support of said catalyst is a silica-alumina containing at least 50% by weight of alumina. The silica content of the support is at most 50% by weight, most often less than or equal to 45% by weight, preferably less than or equal to 40% by weight.

The sources of silicon are well known to a person skilled in the art. By way of example silicic acid, silica in the form of powder or in colloidal form (silica sol), and tetraethylorthosilicate Si(OEt)$_4$ may be mentioned.

When the support of said catalyst is based on silica, it contains more than 50% by weight of silica, and generally it only contains silica.

According to a particularly preferred variant, the support consists of alumina, silica or silica-alumina.

The support may also advantageously further contain from 0.1 to 50% by weight of zeolite. In this case, all the sources of zeolite and all the associated methods of preparation known to a person skilled in the art may be incorporated. Preferably, the zeolite is selected from the group FAU, BEA, ISV, IWR, IWW, MEI, UWY, and preferably the zeolite is selected from the group FAU and BEA, such as zeolite Y and/or beta.

In certain particular cases, the support may also contain at least one part of the VIB and VIII metal (metals), and/or at least one part of the dopant(s) including phosphorus and/or at least one part of the organic compound(s) containing oxygen (at least one additive selected from γ-valerolactone, 4-hydroxyvaleric acid, 2-pentenoic acid, 3-pentenoic acid or 4-pentenoic acid or another additive containing oxygen) and/or nitrogen and/or sulphur that were introduced outside of the operations of impregnation (introduced for example during preparation of the support).

The support is advantageously in the form of beads, extrudates, pellets, or irregular, non-spherical agglomerates, the specific form of which may result from a crushing step.

The catalyst according to the invention also comprises at least one additive selected from γ-valerolactone, 4-hydroxyvaleric acid, 2-pentenoic acid, 3-pentenoic acid or 4-pentenoic acid. The γ-valerolactone, 4-hydroxyvaleric acid and the 2-pentenoic, 3-pentenoic and 4-pentenoic acids correspond respectively to the following formulae (a), (b), (c), (d) and (e) described below:

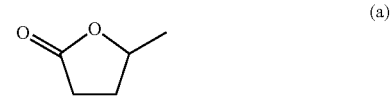

(a)

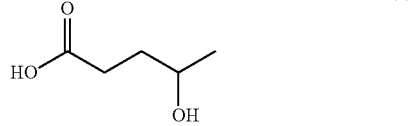

(b)

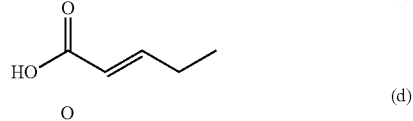

(c)

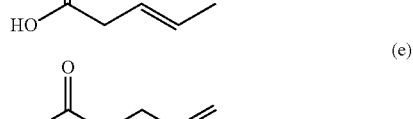

(d)

(e)

The 2-pentenoic acid and 3-pentenoic acid may be in the form of the E or Z isomer or a mixture of these two isomers.

The presence of at least one additive selected from γ-valerolactone, 4-hydroxyvaleric acid, 2-pentenoic acid, 3-pentenoic acid or 4-pentenoic acid on the catalyst gives increased activity with respect to the catalysts without additives and the known dried catalysts with additives.

Without being bound by any theory, it should be noted that 4-hydroxyvaleric acid or 2-pentenoic acid, 3-pentenoic acid or 4-pentenoic acid may be obtained directly or indirectly by hydrolysis of γ-valerolactone. In fact, γ-valerolactone can generate 4-hydroxyvaleric acid by hydrolysis as suggested in the works by Raghunath V. Chaudhari in Top Catal (2012) 55:439-445 or by William N. Fishbein and Samuel P. Bessman in The Journal of Biological Chemistry, Vol. 241, No. 21, issue of November 10, pp. 4842-4847, 1966. The latter may then be dehydrated in an acid medium (Langmuir, 2010, 26 (21), pp 16291-16298 by J. Q. Bond, D. M. Alonso, R. M. West, and J. A. Dumesic) leading to a mixture of 2-pentenoic acid, 3-pentenoic acid and/or 4-pentenoic acid.

According to a variant, the presence of at least one additive selected from γ-valerolactone, 4-hydroxyvaleric acid, 2-pentenoic acid, 3-pentenoic acid and/or 4-pentenoic acid on the catalyst may be due to the addition as such of the additive(s), alone or in a mixture.

According to another variant, the presence of at least one additive selected from 4-hydroxyvaleric acid, 2-pentenoic acid, 3-pentenoic acid and/or 4-pentenoic acid on the catalyst may be due to hydrolysis of the γ-valerolactone contained in the impregnating solution added to said catalyst precursor or support and optionally a subsequent step of dehydration.

The total content of additive(s) selected from γ-valerolactone, 4-hydroxyvaleric acid, 2-pentenoic acid, 3-pentenoic acid and/or 4-pentenoic acid on the catalyst according to the invention is comprised between 1 and 35% by weight, preferably between 2 and 30% by weight, and more preferably between 3 and 25% by weight with respect to the total weight of the catalyst. During preparation of the catalyst, the step or steps of drying following introduction of the additive(s) is (are) carried out at a temperature of less than 200° C. so as preferably to retain at least 30%, preferably at least 50%, and very preferably at least 70% of the quantity of additive(s) introduced, calculated on the basis of the carbon remaining on the catalyst.

The catalyst according to the invention may comprise, in addition to the additive(s) selected from γ-valerolactone, 4-hydroxyvaleric acid, 2-pentenoic acid, 3-pentenoic acid and/or 4-pentenoic acid, another organic compound or a group of organic compounds known for their role as additives. The function of the additives is to increase the catalytic activity, with respect to the catalysts without additives.

In the remainder of the text, by "said additives" is meant at least one additive selected from γ-valerolactone, 4-hydroxyvaleric acid, 2-pentenoic acid, 3-pentenoic acid or 4-pentenoic acid.

More particularly, the catalyst according to the invention may further comprise one or more organic compounds containing oxygen other than said additives and/or one or more organic compounds containing nitrogen and/or one or more organic compounds containing sulphur. Preferably, the catalyst according to the invention may further comprise one or more organic compounds containing oxygen other than said additives, and/or one or more organic compounds containing nitrogen.

Preferably, the organic compound contains at least 2 carbon atoms and at least one oxygen and/or nitrogen atom.

Generally, the organic compound is selected from a compound comprising one or more chemical functions selected from a carboxyl, alcohol, thiol, thioether, sulphone, sulphoxide, ether, aldehyde, ketone, ester, carbonate, amine, nitrile, imide, oxime, urea and amide function. Preferably, the organic compound is selected from a compound comprising two alcohol functions and/or two carboxyl functions and/or two ester functions and/or at least one amide function.

The organic compound containing oxygen may be one or more selected from the compounds comprising one or more chemical functions selected from a carboxyl, alcohol, ether, aldehyde, ketone, ester or carbonate function. By way of example, the organic compound containing oxygen may be one or more selected from the group constituted by ethylene glycol, diethylene glycol, triethylene glycol, a polyethylene glycol (with a molecular weight comprised between 200 and 1500 g/mol), propylene glycol, 2-butoxyethanol, 2-(2-butoxyethoxy)ethanol, 2-(2-methoxyethoxy)ethanol, triethyleneglycol dimethyl ether, glycerol, acetophenone, 2,4-pentanedione, pentanone, acetic acid, maleic acid, malic acid, malonic acid, malic acid, oxalic acid, gluconic acid, tartaric acid, citric acid, γ-ketovaleric acid, a $C_1$-$C_4$ dialkyl succinate, methyl acetoacetate, a lactone, dibenzofuran, a crown ether, orthophthalic acid, glucose and propylene carbonate.

The organic compound containing nitrogen may be one or more selected from the compounds comprising one or more chemical functions selected from an amine or nitrile function. By way of example, the organic compound containing nitrogen may be one or more selected from the group constituted by ethylenediamine, diethylenetriamine, hexamethylenediamine, triethylenetetramine, tetraethylenepentamine, pentaethylenehexamine, acetonitrile, octylamine, guanidine or a carbazole.

The organic compound containing oxygen and nitrogen may be one or more selected from the compounds comprising one or more chemical functions selected from a carboxylic acid, alcohol, ether, aldehyde, ketone, ester, carbonate, amine, nitrile, imide, amide, urea or oxime function. By way of example, the organic compound containing oxygen and nitrogen may be one or more selected from the group constituted by 1,2-cyclohexanediaminetetraacetic acid, monoethanolamine (MEA), N-methylpyrrolidone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DTPA), tetramethylurea, glutamic acid, dimethylglyoxime, bicine or tricine, or a lactam.

The organic compound containing sulphur may be one or more selected from the compounds comprising one or more chemical functions selected from a thiol, thioether, sulphone or sulphoxide function. By way of example, the organic compound containing sulphur may be one or more selected from the group constituted by thioglycolic acid, 2-hydroxy-4-methylthiobutanoic acid, a sulphonated derivative of a benzothiophene or a sulphoxidized derivative of a benzothiophene.

Preferably, the organic compound contains oxygen, and preferably it is selected from triethylene glycol, diethylene glycol, ethylenediaminetetraacetic acid (EDTA), maleic acid, citric acid, dimethylformamide, bicine, or tricine.

When it (they) is/are present, the total content of organic compound(s) with additive function (other than said additives) containing oxygen and/or nitrogen and/or sulphur on the catalyst according to the invention is comprised between 1 and 30% by weight, preferably between 1.5 and 25% by weight, and more preferably between 2 and 20% by weight with respect to the total weight of the catalyst.

Preparation Process

The catalyst according to the invention may be prepared by any process for the preparation of a supported catalyst with an organic compound as additive known to a person skilled in the art.

The catalyst according to the invention may be prepared by a preparation process comprising the following steps:
 a) bringing at least one component of an element of group VIB, at least one component of an element of group VIII, at least one additive selected from γ-valerolactone, 4-hydroxyvaleric acid, 2-pentenoic acid, 3-pentenoic acid or 4-pentenoic acid and optionally phosphorus into contact with a support based on alumina or silica or silica-alumina, or bringing a regenerated catalyst containing a support based on alumina or silica or silica-alumina, at least one component of an element of group VIB, at least one component of an element of group VIII and optionally phosphorus into contact with at least one additive selected from γ-valerolactone, 4-hydroxyvaleric acid, 2-pentenoic acid, 3-pentenoic acid or 4-pentenoic acid, so as to obtain a catalyst precursor,
 b) drying said catalyst precursor originating from step a) at a temperature of less than 200° C., without calcining it subsequently.

First, the process for the preparation of a fresh catalyst will be described, and after that, the process for the preparation of a rejuvenated catalyst.

Process for the Preparation of a Fresh Catalyst

The contacting step a) comprises several embodiments, which differ in particular by the time of introduction of the additive selected from γ-valerolactone, 4-hydroxyvaleric acid, 2-pentenoic acid, 3-pentenoic acid or 4-pentenoic acid, which may be carried out either at the same time as impregnation of the metals (co-impregnation), or after impregnation of the metals (post-impregnation), or finally before impregnation of the metals (pre-impregnation). Moreover, the contacting step may combine at least two embodiments, for example co-impregnation and post-impregnation. These various embodiments will be described later. Each embodiment, alone or in combination, may take place in one or more steps.

It is important to emphasize that during its preparation process, the catalyst according to the invention does not undergo calcination after introduction of the additive or additives selected from γ-valerolactone, 4-hydroxyvaleric acid, 2-pentenoic acid, 3-pentenoic acid or 4-pentenoic acid or any other organic compound containing oxygen and/or nitrogen and/or sulphur in order to preserve, at least partly, the additive or additives selected from γ-valerolactone, 4-hydroxyvaleric acid, 2-pentenoic acid, 3-pentenoic acid or 4-pentenoic acid or any other organic compound in the catalyst. By calcination is meant here a heat treatment under a gas containing air or oxygen at a temperature greater than or equal to 200° C.

However, the catalyst precursor may undergo a calcining step before the introduction of at least one additive selected from γ-valerolactone, 4-hydroxyvaleric acid, 2-pentenoic acid, 3-pentenoic acid or 4-pentenoic acid or any other organic compound containing oxygen and/or nitrogen and/or sulphur, in particular after impregnation of the elements of group VIB and VIII (post-impregnation) optionally in the presence of phosphorus and/or of another dopant or during regeneration of a catalyst that has already been used. The hydrogenating function comprising the elements of group VIB and group VIII of the catalyst according to the invention, also called the active phase, is then in an oxide form.

According to another variant, the catalyst precursor does not undergo a calcining step after impregnation of the elements of group VIB and VIII (post-impregnation), it is simply dried. The hydrogenating function comprising the elements of group VIB and group VIII of the catalyst according to the invention, also called the active phase, is not then in an oxide form.

Whatever the embodiment, the contacting step a) generally comprises at least one step of impregnation, preferably a step of dry impregnation, in which the support is impregnated with an impregnating solution comprising at least one element of group VIB, at least one element of group VIII, and optionally phosphorus. In the case of co-impregnation, described in detail below, this impregnating solution further comprises at least one additive selected from γ-valerolactone, 4-hydroxyvaleric acid, 2-pentenoic acid, 3-pentenoic acid or 4-pentenoic acid. The elements of group VIB and group VIII are generally introduced by impregnation, preferably by dry impregnation or by impregnation with excess solution. Preferably, all of the elements of group VIB and group VIII are introduced by impregnation, preferably by dry impregnation, regardless of the embodiment.

The elements of group VIB and group VIII may also be introduced partly during forming said support at the time of mixing with at least one alumina gel selected as matrix, the rest of the hydrogenating elements then being introduced subsequently by impregnation. Preferably, when the elements of group VIB and group VIII are introduced partly at the time of mixing, the proportion of the element of group VIB introduced during this step is less than 5% by weight of the total quantity of the element of group VIB introduced on the final catalyst.

Preferably, the element of group VIB is introduced at the same time as the element of group VIII, regardless of the method of introduction.

The molybdenum precursors that may be used are well known to a person skilled in the art. For example, among the sources of molybdenum, the oxides and hydroxides, the molybdic acids and salts thereof can be used, in particular the ammonium salts such as ammonium molybdate, ammonium heptamolybdate, phosphomolybdic acid ($H_3PMo_{12}O_{40}$) and salts thereof, and optionally silicomolybdic acid ($H_4SiMo_{12}O_{40}$) and salts thereof. The sources of molybdenum may also be heteropoly compounds of the Keggin, lacunar Keggin, substituted Keggin, Dawson, Anderson, or Strandberg type, for example. Molybdenum trioxide and the heteropolyanions of the Strandberg, Keggin, lacunar Keggin or substituted Keggin type are preferably used.

The tungsten precursors that may be used are also well known to a person skilled in the art. For example, among the sources of tungsten, the oxides and hydroxides, the tungstic acids and salts thereof can be used, in particular the ammonium salts such as ammonium tungstate, ammonium metatungstate, phosphotungstic acid and salts thereof, and optionally silicotungstic acid ($H_4SiW_{12}O_{40}$) and salts thereof. The sources of tungsten may also be heteropoly compounds of the Keggin, lacunar Keggin, substituted Keggin, or Dawson type, for example. The oxides and the ammonium salts such as ammonium metatungstate or the heteropolyanions of the Keggin, lacunar Keggin or substituted Keggin type are preferably used.

The precursors of the elements of group VIII that may be used are advantageously selected from the oxides, hydroxides, hydroxycarbonates, carbonates and nitrates of the elements of group VIII, for example nickel hydroxycarbonate, cobalt carbonate or hydroxide are preferably used.

Phosphorus, when it is present, may be introduced wholly or partly by impregnation. Preferably, it is introduced by impregnation, preferably dry impregnation, using a solution containing the precursors of the elements of group VIB and group VIII.

Said phosphorus may advantageously be introduced alone or in a mixture with at least one of the elements of group VIB and group VIII, during any of the steps for impregnation of the hydrogenating function if this is introduced in several goes.

Said phosphorus may also be introduced, wholly or partly, during the impregnation of at least one additive selected from γ-valerolactone, 4-hydroxyvaleric acid, 2-pentenoic acid, 3-pentenoic acid or 4-pentenoic acid if this is introduced separately from the hydrogenating function (the case of post- and pre-impregnation described later), and in the presence or absence of an organic compound containing oxygen and/or nitrogen and/or sulphur other than said additives. It may also be introduced during synthesis of the support, at any step of the synthesis thereof. It may thus be introduced before, during or after mixing of the alumina gel matrix selected, such as for example and preferably the alumina precursor aluminium oxyhydroxide (boehmite).

The preferred phosphorus precursor is orthophosphoric acid $H_3PO_4$, but salts and esters thereof such as the ammonium phosphates are also suitable. Phosphorus may also be introduced at the same time as the element(s) of group VIB in the form of heteropolyanions of the Keggin, lacunar Keggin, substituted Keggin or Strandberg type.

The additive or additives selected from γ-valerolactone, 4-hydroxyvaleric acid, 2-pentenoic acid, 3-pentenoic acid or 4-pentenoic acid is/are advantageously introduced into an impregnating solution which, depending on the preparation process, may be the same solution or a different solution from that containing the elements of group VIB and VIII, in a total quantity corresponding to:

a total molar ratio of the additive(s) selected from γ-valerolactone, 4-hydroxyvaleric acid, 2-pentenoic acid, 3-pentenoic acid or 4-pentenoic acid to the element(s) of group VIB of the catalyst precursor comprised between 0.2 and 2.0 mol/mol, preferably comprised between 0.3 and 1.7 mol/mol, preferably comprised between 0.5 and 1.5 mol/mol and very preferably comprised between 0.8 and 1.2 mol/mol, calculated on the basis of the components introduced into the impregnating solution(s), and a total molar ratio of the additive(s) selected from γ-valerolactone, 4-hydroxyvaleric acid, 2-pentenoic acid, 3-pentenoic acid or 4-pentenoic acid to the element(s) of group VIII of the catalyst precursor comprised between 0.1 and 5.0 mol/mol, preferably comprised between 0.5 and 4.0 mol/mol, preferably comprised between 1.0 and 3.0 mol/mol and very preferably comprised between 1.5 and 3.0 mol/mol, calculated on the basis of the components introduced into the impregnating solution(s).

Any impregnating solution described in the present invention may comprise any polar solvent known to a person skilled in the art. Said polar solvent used is advantageously selected from the group formed by methanol, ethanol, water, phenol, cyclohexanol, used alone or in a mixture. Said polar solvent may also be advantageously selected from the group formed by propylene carbonate, DMSO (dimethylsulphoxide), N-methylpyrrolidone (NMP) or sulpholane, used alone or in a mixture. Preferably, a polar protic solvent is used. A list of the usual polar solvents as well as their dielectric constant may be found in the book "Solvents and Solvent Effects in Organic Chemistry" C. Reichardt, Wiley-VCH, 3rd edition, 2003, pages 472-474. Very preferably, the solvent used is water or ethanol, and particularly preferably the solvent is water. In a possible embodiment, the solvent may be absent from the impregnating solution.

When the catalyst further comprises a dopant selected from boron, fluorine or a mixture of boron and fluorine, introduction of this dopant or these dopants may be done in the same way as the introduction of phosphorus at various steps of the preparation and in various ways. Said dopant may advantageously be introduced alone or in a mixture with at least one of the elements of group VIB and group VIII, during any of the steps of impregnation of the hydrogenating function if this is introduced in several goes. Said dopant may also be introduced, wholly or partly, during impregnation of at least one additive selected from γ-valerolactone, 4-hydroxyvaleric acid, 2-pentenoic acid, 3-pentenoic acid or 4-pentenoic acid if the latter is introduced separately from the hydrogenating function (the case of post- and pre-impregnation, described later), in the presence or absence of an organic compound containing oxygen and/or nitrogen and/or sulphur other than said additives. It may also be introduced from synthesis of the support onwards, at any step of the synthesis thereof. It may thus be introduced before, during or after mixing of the alumina gel matrix selected, such as for example and preferably the alumina precursor aluminium oxyhydroxide (boehmite).

Said dopant, when present, is advantageously introduced in a mixture with the precursor(s) of the elements of group VIB and group VIII, wholly or partly on the formed support by dry impregnation of said support using a solution, preferably aqueous, containing the precursors of the metals, the phosphorus precursor and the precursor(s) of the dopant(s) (and also containing at least one additive selected from γ-valerolactone, 4-hydroxyvaleric acid, 2-pentenoic acid, 3-pentenoic acid or 4-pentenoic acid in the co-impregnation embodiment).

The boron precursors may be boric acid, orthoboric acid $H_3BO_3$, ammonium diborate or pentaborate, boron oxide, boric esters. Boron may be introduced for example by means of a solution of boric acid in a water/alcohol mixture or also in a water/ethanolamine mixture. Preferably the boron precursor, if boron is introduced, is orthoboric acid.

The fluorine precursors that may be used are well known to a person skilled in the art. For example, the fluoride anions may be introduced in the form of hydrofluoric acid or salts thereof. These salts are formed with alkali metals, ammonium or an organic compound. In the latter case, the salt is advantageously formed in the reaction mixture by reaction between the organic compound and hydrofluoric acid.

Fluorine may be introduced for example by impregnation of an aqueous solution of hydrofluoric acid, or of ammonium fluoride or of ammonium bifluoride.

When the catalyst further comprises an additional additive (in addition to the additive(s) selected from γ-valerolactone, 4-hydroxyvaleric acid, 2-pentenoic acid, 3-pentenoic acid or 4-pentenoic acid) or a group of additional additives selected from an organic compound containing oxygen and/or nitrogen and/or sulphur other than said additives, this may be introduced in the impregnating solution in step a).

The total molar ratio of organic compound(s) containing oxygen and/or nitrogen and/or sulphur other than said additives to the elements of group VIB on the catalyst is comprised between 0.05 and 5 mol/mol, preferably comprised between 0.1 and 4 mol/mol, preferably comprised between 0.2 and 3 mol/mol, calculated on the basis of the components introduced into the impregnating solution(s).

The total molar ratio of organic compound(s) containing oxygen and/or nitrogen and/or sulphur other than said additives with respect to the sum of γ-valerolactone, 4-hydroxyvaleric acid, 2-pentenoic acid, 3-pentenoic acid and/or 4-pentenoic acid is comprised between 0.05 and 6 mol/mol, preferably comprised between 0.1 and 5 mol/mol, more preferably comprised between 0.2 and 4 mol/mol, calculated on the basis of the components introduced into the impregnating solution(s).

Advantageously, after each impregnating step, the impregnated support is left to mature. Maturation allows the impregnating solution to disperse homogeneously within the support.

Any maturation step described in the present invention is advantageously carried out at atmospheric pressure, in a water-saturated atmosphere and at a temperature comprised between 17° C. and 50° C., and preferably at ambient temperature. Generally a maturation time comprised between ten minutes and forty-eight hours and preferably comprised between thirty minutes and five hours is sufficient. Longer times are not excluded, but do not necessarily provide any improvement.

According to step b) of the preparation process according to the invention, the catalyst precursor obtained in step a), optionally matured, is subjected to a drying step at a temperature of less than 200° C. without a subsequent calcining step.

Any drying step subsequent to the introduction of said additives described in the present invention is carried out at a temperature of less than 200° C., preferably comprised between 50 and 180° C., preferably between 70 and 150° C. and very preferably between 75 and 130° C.

The drying step is advantageously carried out by any technique known to a person skilled in the art. It is advantageously carried out at atmospheric pressure or at reduced pressure. Preferably this step is carried out at atmospheric pressure. It is advantageously carried out in a transversed bed using air or any other hot gas.

Preferably, when drying is carried out in a fixed bed, the gas used is either air, or an inert gas such as argon or nitrogen. Very preferably, drying is carried out in a transversed bed in the presence of nitrogen and/or air. Preferably, the drying step is of short duration, comprised between 5 minutes and 4 hours, preferably between 30 minutes and 4 hours and very preferably between 1 hour and 3 hours.

Drying is then carried out so as preferably to retain at least 30% of the additive(s) selected from γ-valerolactone, 4-hydroxyvaleric acid, 2-pentenoic acid, 3-pentenoic acid or 4-pentenoic acid introduced during an impregnation step, preferably this quantity is greater than 50% and even more preferably greater than 70%, calculated on the basis of the carbon remaining on the catalyst. When an organic compound containing oxygen and/or nitrogen and/or sulphur other than said additives is present, the drying step is carried out so as preferably to retain at least 30%, preferably at least 50%, and very preferably at least 70% of the quantity introduced, calculated on the basis of the carbon remaining on the catalyst.

At the end of the drying step b), a dried catalyst is obtained, which is not subjected to any subsequent calcining step.

Co-impregnation

According to a first embodiment of step a) of the process for the preparation of the (fresh) catalyst, said components of the elements of group VIB, of the elements of group VIII, of at least one additive selected from γ-valerolactone, 4-hydroxyvaleric acid, 2-pentenoic acid, 3-pentenoic acid or 4-pentenoic acid and optionally phosphorus are deposited on said support, by one or more co-impregnation steps, i.e. said components of the elements of group VIB, of group VIII, of at least one additive selected from γ-valerolactone, 4-hydroxyvaleric acid, 2-pentenoic acid, 3-pentenoic acid or 4-pentenoic acid and optionally phosphorus are introduced simultaneously into said support ("co-impregnation"). According to a variant, step a) is the following step:

a') impregnating a support based on alumina or silica or silica-alumina with at least one solution containing at least one element of group VIB, at least one element of group VIII, at least one additive selected from γ-valerolactone, 4-hydroxyvaleric acid, 2-pentenoic acid, 3-pentenoic acid or 4-pentenoic acid and optionally phosphorus so as to obtain a catalyst precursor.

The co-impregnation step or steps is (are) preferably carried out by dry impregnation or by impregnation with excess solution. When this first embodiment comprises the utilization of several co-impregnation steps, each co-impregnation step is preferably followed by an intermediate drying step at a temperature of less than 200° C., advantageously comprised between 50 and 180° C., preferably between 70 and 150° C., very preferably between 75 and 130° C., optionally observing a period of maturation between impregnation and drying.

Very preferably, during preparation by co-impregnation, the elements of group VIB and group VIII, at least one additive selected from γ-valerolactone, 4-hydroxyvaleric acid, 2-pentenoic acid, 3-pentenoic acid or 4-pentenoic acid, optionally phosphorus, optionally another dopant selected from boron and/or fluorine and optionally an organic compound containing oxygen and/or nitrogen and/or sulphur other than said additives are introduced in step a) entirely after the forming of said support, by dry impregnation of said support using an aqueous impregnating solution containing the precursors of the elements of group VIB and group VIII, at least one additive selected from γ-valerolactone, 4-hydroxyvaleric acid, 2-pentenoic acid, 3-pentenoic acid or 4-pentenoic acid, optionally the phosphorus precursor, optionally the dopant precursor selected from boron and/or fluorine and optionally the organic compound containing oxygen and/or nitrogen and/or sulphur other than said additives.

Post-impregnation

According to a second embodiment of step a) of the process for the preparation of the (fresh) catalyst according to the invention, at least one additive selected from γ-valerolactone, 4-hydroxyvaleric acid, 2-pentenoic acid, 3-pentenoic acid or 4-pentenoic acid is brought into contact with a dried and optionally calcined impregnated support comprising at least one component of an element of group VIB, at least one component of an element of group VIII and optionally phosphorus, said support being based on alumina or silica or silica-alumina, so as to obtain a catalyst precursor.

This second embodiment is a preparation by "post-impregnation" of at least one additive selected from γ-valerolactone, 4-hydroxyvaleric acid, 2-pentenoic acid, 3-pentenoic acid or 4-pentenoic acid. The latter is carried out for example by dry impregnation.

According to this second embodiment, the contacting according to step a) comprises the following successive steps, which will be described in detail later:

a1) impregnating a support based on alumina or silica or silica-alumina with at least one solution containing at least one element of group VIB, at least one element of group VIII and optionally phosphorus in order to obtain an impregnated support, a2) drying the impregnated support obtained in step a1) at a temperature of less than 200° C. in order to obtain a dried impregnated support, and optionally calcining the dried impregnated support in order to obtain a calcined impregnated support, a3) impregnating the dried and optionally calcined impregnated support obtained in step a2) with an impregnating solution comprising at least one additive selected from γ-valerolactone, 4-hydroxyvaleric acid, 2-pentenoic acid, 3-pentenoic acid or 4-pentenoic acid so as to obtain a catalyst precursor, a4) optionally, leaving the catalyst precursor obtained in step a3) to mature.

In step a1) of the embodiment utilizing post-impregnation, the introduction of the elements of group VIB and group VIII and optionally phosphorus on the support may advantageously be carried out by one or more operations of impregnation with excess solution on the support, or preferably by one or more operations of dry impregnation, and preferably by a single dry impregnation of said support, using solution(s), preferably aqueous, containing the precursor or precursors of metals and preferably the phosphorus precursor.

When several impregnation steps are carried out, each impregnation step is preferably followed by an intermediate drying step at a temperature of less than 200° C., advantageously between 50 and 180° C., preferably between 70 and 150° C., very preferably between 75 and 130° C., and optionally observing a period of maturation between impregnation and drying. Each intermediate drying step, prior to the introduction of at least one additive selected from γ-valerolactone, 4-hydroxyvaleric acid, 2-pentenoic acid, 3-pentenoic acid or 4-pentenoic acid, may be followed by a calcining step under the conditions described below for step a2).

Very preferably, during preparation by post-impregnation, the elements of group VIB and group VIII and optionally phosphorus, optionally another dopant selected from boron and/or fluorine and optionally an organic compound containing oxygen and/or nitrogen and/or sulphur other than said additives are introduced in step a1) entirely after the forming of said support, by dry impregnation of said support using an aqueous impregnating solution containing the precursors of the elements of group VIB and group VIII, the phosphorus precursor, and optionally the dopant precursor selected from boron and/or fluorine and optionally the organic compound containing oxygen and/or nitrogen and/or sulphur other than said additives.

According to another variant, the elements of group VIB and group VIII and optionally phosphorus, optionally another dopant selected from boron and/or fluorine and optionally an organic compound containing oxygen and/or nitrogen and/or sulphur other than said additives may be introduced in step a1) successively by means of several impregnating solutions containing one or more of the components.

Advantageously, the impregnated support obtained in step a1) is left to mature under the conditions described above for maturation.

According to step a2), the impregnated support obtained in step a1) is dried at a temperature of less than 200° C. in order to obtain an impregnated support, dried under the drying conditions described above.

Optionally, the dried impregnated support may then undergo calcining. Calcining is generally carried out at a temperature comprised between 200° C. and 900° C., preferably comprised between 250° C. and 750° C. The calcination time is generally comprised between 0.5 hours and 16 hours, preferably between 1 hour and 5 hours. It is generally carried out under air. Calcining makes it possible to convert the precursors of the group VIB and group VIII metals to oxides.

According to step a3), the dried impregnated support obtained in step a2) is impregnated with an impregnating solution comprising at least one additive selected from γ-valerolactone, 4-hydroxyvaleric acid, 2-pentenoic acid, 3-pentenoic acid or 4-pentenoic acid so as to obtain a catalyst precursor.

The additive or additives selected from γ-valerolactone, 4-hydroxyvaleric acid, 2-pentenoic acid, 3-pentenoic acid or 4-pentenoic acid may advantageously be deposited in one or more steps either by impregnation in excess, or by dry impregnation, or by any other means known to a person skilled in the art.

Preferably, said additive or additives is/are introduced by dry impregnation, in the presence or absence of a solvent as described above.

Preferably, the solvent in the impregnating solution used in step a3) is water, which facilitates implementation on an industrial scale.

The additive or additives selected from γ-valerolactone, 4-hydroxyvaleric acid, 2-pentenoic acid, 3-pentenoic acid or 4-pentenoic acid is/are advantageously introduced into the impregnating solution in step a3) with the molar ratios per element of group VIB or of group VIII described above.

When in addition it is desired to introduce an additional additive (in addition to the additive(s) selected from γ-valerolactone, 4-hydroxyvaleric acid, 2-pentenoic acid, 3-pentenoic acid or 4-pentenoic acid) or a group of additional additives selected from an organic compound containing oxygen and/or nitrogen and/or sulphur other than said additives, this may be introduced in the impregnating solution in step a1) and/or into the impregnating solution in step a3) or by an additional impregnation step at any time in the preparation process before the final drying in step b), it being understood that a calcining step is not carried out after its introduction. This compound is introduced in the proportions described above.

According to step a4), optionally the catalyst precursor obtained in step a3) is left to mature, under the maturation conditions described above.

According to step b) of the preparation process according to the invention, the catalyst precursor that was optionally matured in step a4) is subjected to a step of drying at a temperature of less than 200° C. without a subsequent calcining step, as described above.

Pre-impregnation

According to a third embodiment of step a) of the process for the preparation of the (fresh) catalyst according to the invention, at least one component of an element of group VIB, at least one component of an element of group VIII, and optionally phosphorus are brought into contact with the support based on alumina or silica or silica-alumina that contains at least one additive selected from γ-valerolactone, 4-hydroxyvaleric acid, 2-pentenoic acid, 3-pentenoic acid or 4-pentenoic acid so as to obtain a catalyst precursor.

This third embodiment is a preparation by "pre-impregnation" of at least one additive selected from γ-valerolactone, 4-hydroxyvaleric acid, 2-pentenoic acid, 3-pentenoic acid or 4-pentenoic acid. This is carried out for example by dry impregnation.

According to this third embodiment, the contacting according to step a) comprises the following successive steps, which will be described in detail later:

a1') preparing a support comprising at least one additive selected from γ-valerolactone, 4-hydroxyvaleric acid, 2-pentenoic acid, 3-pentenoic acid or 4-pentenoic acid and optionally at least one part of phosphorus, a2') impregnating the support obtained in step a1') with an impregnating solution comprising at least one element of group VIB, at least one element of group VIII and optionally phosphorus so as to obtain a catalyst precursor, a3') optionally, leaving the catalyst precursor obtained in step a2') to mature.

In step a1') of the embodiment utilizing pre-impregnation, a support is prepared comprising at least one additive selected from γ-valerolactone, 4-hydroxyvaleric acid, 2-pentenoic acid, 3-pentenoic acid or 4-pentenoic acid and optionally at least one part of phosphorus. The additive or additives selected from γ-valerolactone, 4-hydroxyvaleric acid, 2-pentenoic acid, 3-pentenoic acid or 4-pentenoic acid may be introduced at any time in the preparation of the support, and preferably during forming or by impregnation on a support already formed.

If introduction of at least one additive selected from γ-valerolactone, 4-hydroxyvaleric acid, 2-pentenoic acid, 3-pentenoic acid or 4-pentenoic acid on the previously formed support is selected, the latter may be carried out as is indicated for step a3) of post-impregnation. It will then be followed by an optional maturation step and by drying at a temperature of less than 200° C. under the conditions of maturation and drying as described above.

If introduction during forming is selected, preferably said forming is carried out by mixing-extrusion, by pelletization, by the oil-drop method, by granulation with a rotating plate or by any other method well known to a person skilled in the art. Very preferably, said forming is carried out by mixing-extrusion, and the γ-valerolactone, 4-hydroxyvaleric acid, 2-pentenoic acid, 3-pentenoic acid and/or 4-pentenoic acid may be introduced at any time during mixing-extrusion. The formed material obtained at the end of the forming step then advantageously undergoes a step of heat treatment at a temperature such that at least a proportion of said additive(s) remains present.

The same applies to the phosphorus optionally present in said support in step a1').

Phosphorus may be introduced at any time in the preparation of the support, and preferably during forming or by impregnation on a support already formed as described above. If only phosphorus is introduced during forming, i.e. without an additive selected from γ-valerolactone, 4-hydroxyvaleric acid, 2-pentenoic acid, 3-pentenoic acid or 4-pentenoic acid itself then introduced by impregnation, the calcination temperature following its introduction may then advantageously be carried out at a temperature of less than 1,000° C.

In step a2') of the embodiment utilizing pre-impregnation, introduction of the elements of group VIB and group VIII and optionally phosphorus may advantageously be carried out by one or more impregnations in excess solution on the support, or preferably by one or more dry impregnations, and preferably by a single dry impregnation of said support, using solution(s), preferably aqueous, containing the precursor or precursors of metals and optionally the phosphorus precursor.

Advantageously, the catalyst precursor obtained in step a2') is left to mature under the maturation conditions described above.

When in addition it is desired to introduce an additional additive (in addition to the additive(s) selected from γ-valerolactone, 4-hydroxyvaleric acid, 2-pentenoic acid, 3-pentenoic acid or 4-pentenoic acid) or a group of additional additives selected from an organic compound containing oxygen and/or nitrogen and/or sulphur other than said additives, this may be introduced into the support in step a1') during forming or by impregnation, and/or into the impregnating solution in step a2') or by an additional impregnation step at any time in the preparation process before the final drying in step b), it being understood that a calcining step is not carried out after its introduction.

The three embodiments described above may be carried out alone as described, or in a mixture in order to give rise to other hybrid methods of preparation depending on the technical and practical constraints.

According to another alternative embodiment, the contacting according to step a) combines at least two methods of contacting, for example co-impregnation of an organic compound and post-impregnation of an organic compound, which may be identical to or different from that used for co-impregnation, given that at least one of the organic compounds is selected from γ-valerolactone, 4-hydroxyvaleric acid, 2-pentenoic acid, 3-pentenoic acid or 4-pentenoic acid.

According to this alternative embodiment, the contacting according to step a) comprises the following successive steps:
  a1") by co-impregnation, bringing a solution containing at least one element of group VIB, at least one element of group VIII, at least one organic compound containing oxygen and/or nitrogen and/or sulphur, and optionally phosphorus into contact with a support based on alumina or silica or silica-alumina so as to obtain an impregnated support,
  a2") drying the impregnated support originating from step a1") at a temperature of less than 200° C., without calcining it subsequently, in order to obtain a dried impregnated support,
  a3") bringing the dried impregnated support originating from step a2") into contact with a solution of an organic compound containing oxygen and/or nitrogen and/or sulphur, identical to or different from that used in step a1") so as to obtain a catalyst precursor,
  a4") optionally, leaving the catalyst precursor obtained in step a3") to mature.
  and at least one of the organic compounds in step a1") or in step a3") is selected from γ-valerolactone, 4-hydroxyvaleric acid, 2-pentenoic acid, 3-pentenoic acid or 4-pentenoic acid.

The operating conditions described above are of course applicable in the context of this last-mentioned embodiment.

Process for the Preparation of a Rejuvenated Catalyst

The catalyst according to the invention may be a rejuvenated catalyst. This catalyst may be prepared by the preparation process comprising the following steps:
  a) bringing a regenerated catalyst containing a support based on alumina or silica or silica-alumina, at least one component of an element of group VIB, at least one component of an element of group VIII and optionally phosphorus into contact with at least one additive selected from γ-valerolactone, 4-hydroxyvaleric acid, 2-pentenoic acid, 3-pentenoic acid or 4-pentenoic acid so as to obtain a catalyst precursor,
  b) drying said catalyst precursor originating from step a) at a temperature of less than 200° C., without calcining it subsequently.

According to step a), a regenerated catalyst is brought into contact with at least one additive selected from γ-valerolactone, 4-hydroxyvaleric acid, 2-pentenoic acid, 3-pentenoic acid or 4-pentenoic acid, so as to obtain a catalyst precursor.

The regenerated catalyst is a catalyst that has been used as a catalyst in a catalytic unit and in particular in hydrotreatment and/or hydrocracking and that has undergone at least one step of calcining, in order to burn off the coke (regeneration). Regeneration allows combustion of the carbon deposited on the catalyst during its industrial use. It may be carried out by any means known to a person skilled in the art. Regeneration is generally carried out at temperatures comprised between 350 and 550° C., and most often between 400 and 520° C., or between 420 and 520° C., or between 450 and 520° C., temperatures of less than 500° C. often being advantageous.

The regenerated catalyst contains a support based on alumina or silica or silica-alumina, at least one component of an element of group VIB, at least one component of an element of group VIII and optionally phosphorus in the respective proportions given above. Following regeneration (calcining step), the hydrogenating function comprising the elements of group VIB and group VIII of the regenerated catalyst is in an oxide form. It may also contain dopants other than phosphorus, as described above.

According to this embodiment, the contacting according to step a) comprises the following successive steps:

a1''') impregnating a regenerated catalyst containing a support based on alumina or silica or silica-alumina, at least one component of an element of group VIB, at least one component of an element of group VIII and optionally phosphorus with an impregnating solution comprising at least one additive selected from γ-valerolactone, 4-hydroxyvaleric acid, 2-pentenoic acid, 3-pentenoic acid or 4-pentenoic acid so as to obtain a catalyst precursor, a2''') optionally, leaving the catalyst precursor obtained in step a1''') to mature.

Preferably, the contacting in step a) is carried out by impregnation of the regenerated catalyst with an impregnating solution comprising at least one additive selected from γ-valerolactone, 4-hydroxyvaleric acid, 2-pentenoic acid, 3-pentenoic acid or 4-pentenoic acid so as to obtain a catalyst precursor.

The additive or additives selected from γ-valerolactone, 4-hydroxyvaleric acid, 2-pentenoic acid, 3-pentenoic acid or 4-pentenoic acid may advantageously be deposited in one or more steps either by impregnation in excess, or by dry impregnation, or by any other means known to a person skilled in the art.

Preferably, the additive or additives selected from γ-valerolactone, 4-hydroxyvaleric acid, 2-pentenoic acid, 3-pentenoic acid or 4-pentenoic acid is/are introduced by dry impregnation, in the presence or absence of a solvent as described above.

Preferably, the solvent in the impregnating solution used is water, which facilitates implementation on an industrial scale.

The additive or additives selected from γ-valerolactone, 4-hydroxyvaleric acid, 2-pentenoic acid, 3-pentenoic acid or 4-pentenoic acid is/are advantageously introduced into the impregnating solution with the molar ratios per element of group VIB or of group VIII described above.

When in addition it is desired to introduce an additional additive (in addition to the additive(s) selected from γ-valerolactone, 4-hydroxyvaleric acid, 2-pentenoic acid, 3-pentenoic acid or 4-pentenoic acid) or a group of additional additives selected from an organic compound containing oxygen and/or nitrogen and/or sulphur other than said additives, this may be introduced in the impregnating solution in step a1''') or by an additional impregnation step at any time in the preparation process before the final drying in step b), it being understood that a calcining step is not carried out after its introduction. This compound is introduced in the proportions described above.

According to step a2'''), optionally the catalyst precursor obtained in step a1''') is left to mature, under the maturation conditions described above.

According to step b) of the preparation process according to the invention, the catalyst precursor that has optionally been matured during step a2''') is subjected to a step of drying at a temperature of less than 200° C. without a subsequent calcining step, as described above.

Sulphurization

Before it is used for the hydrotreatment and/or hydrocracking reaction, it is advantageous to convert the dried catalyst obtained according to any one of the methods of introduction described in the present invention to a sulphurized catalyst in order to form its active species. This activation or sulphurization step is carried out by the methods well known to a person skilled in the art, and advantageously under a sulpho-reducing atmosphere in the presence of hydrogen and hydrogen sulphide.

At the end of step b) according to the various methods of preparation of the method according to the invention, said catalyst obtained is therefore advantageously subjected to a sulphurization step, without an intermediate calcining step.

Said dried catalyst is advantageously sulphurized ex situ or in situ. The sulphurization agents are $H_2S$ gas or any other compound containing sulphur used for the activation of hydrocarbon feedstocks for sulphurization of the catalyst. Said compounds containing sulphur are advantageously selected from the alkyl disulphides such as for example dimethyl disulphide (DMDS), the alkyl sulphides, such as for example dimethyl sulphide, the thiols such as for example n-butylmercaptan (or 1-butanethiol), the polysulphide compounds of the tert-nonylpolysulphide type, or any other compound known to a person skilled in the art for obtaining good sulphurization of the catalyst. Preferably the catalyst is sulphurized in situ in the presence of a sulphurization agent and a hydrocarbon-containing feedstock. Very preferably the catalyst is sulphurized in situ in the presence of a hydrocarbon-containing feedstock to which dimethyl disulphide has been added.

Hydrotreatment and/or Hydrocracking Process

Finally, the invention also relates to the use of the catalyst according to the invention or prepared by the preparation process according to the invention in processes for hydrotreatment and/or hydrocracking of hydrocarbon-containing cuts.

The catalyst according to the invention, which preferably has undergone a sulphurization step beforehand, is used advantageously for the reactions of hydrotreatment and/or hydrocracking of hydrocarbon-containing feedstocks such as petroleum cuts, cuts originating from coal or the hydrocarbons produced from natural gas, optionally in mixtures, or from a hydrocarbon-containing cut originating from biomass and more particularly for the reactions of hydrogenation, hydrodenitrogenation, hydrodearomatization, hydrodesulphurization, hydrodeoxygenation, hydrodemetallization or hydroconversion of hydrocarbon-containing feedstocks.

In these uses, the catalyst according to the invention, which preferably has undergone a sulphurization step beforehand, has improved activity with respect to the catalysts of the prior art. This catalyst may also advantageously be used during pre-treatment of the feedstocks for catalytic cracking or hydrocracking, or hydrodesulphurization of residues or deep hydrodesulphurization of diesels (ULSD, Ultra Low Sulphur Diesel).

The feedstocks used in the hydrotreatment process are for example gasolines, gasoils, vacuum gasoils, atmospheric residues, vacuum residues, atmospheric distillates, vacuum distillates, heavy fuel oils, oils, waxes and paraffins, used oils, deasphalted residues or crude oils, feedstocks obtained from thermal or catalytic conversion processes, lignocellulosic feedstocks or more generally feedstocks originating from biomass, used alone or in a mixture. The feedstocks that are treated, and in particular those mentioned above, generally contain heteroatoms such as sulphur, oxygen and nitrogen, and for the heavy feedstocks, most often they also contain metals.

The operating conditions used in the processes utilizing the reactions of hydrotreatment of hydrocarbon-containing feedstocks described above are generally as follows: the temperature is advantageously comprised between 180 and 450° C., and preferably between 250 and 440° C., the pressure is advantageously comprised between 0.5 and 30 MPa, and preferably between 1 and 18 MPa, the hourly space velocity is advantageously comprised between 0.1 and 20 h$^{-1}$ and preferably between 0.2 and 5 h$^{-1}$, and the hydrogen/feedstock ratio expressed as volume of hydrogen, measured under standard conditions of temperature and pressure, per volume of liquid feedstock is advantageously comprised between 50 l/l and 5,000 l/l and preferably from 80 to 2,000 l/l.

According to a first method of use, said hydrotreatment process according to the invention is a process of hydrotreatment, and in particular of hydrodesulphurization (HDS) of a gasoil cut, carried out in the presence of at least one catalyst according to the invention. Said hydrotreatment process according to the invention aims to remove the sulphur-containing compounds present in said gasoil cut so as to reach the current environmental standards, namely a permitted sulphur content of up to 10 ppm. It also makes it possible to lower the contents of aromatics and nitrogen in the gasoil cut to be hydrotreated.

Said gasoil cut to be hydrotreated according to the process of the invention contains 0.02 to 5.0% by weight of sulphur. It advantageously originates from direct distillation (or straight run gasoil), from a coking unit, from a visbreaking unit, from a steam cracking unit, from a unit for hydrotreatment and/or hydrocracking of heavier feedstocks and/or from a catalytic cracking unit (Fluid Catalytic Cracking).

Said gasoil cut preferably has at least 90% of compounds the boiling point of which is comprised between 250° C. and 400° C. at atmospheric pressure.

The process for hydrotreatment of said gasoil cut according to the invention is carried out under the following operating conditions: a temperature comprised between 200 and 400° C., preferably between 300 and 380° C., a total pressure comprised between 2 MPa and 10 MPa and more preferably between 3 MPa and 8 MPa with a ratio of volume of hydrogen to volume of hydrocarbon-containing feedstock, expressed as volume of hydrogen, measured under standard conditions of temperature and pressure, per volume of liquid feedstock, comprised between 100 and 600 liters per liter and more preferably between 200 and 400 liters per liter and an hourly space velocity comprised between 1 and 10 h$^{-1}$, preferably between 2 and 8 h$^{-1}$. The HSV corresponds to the inverse contact time expressed in hours and is defined by the ratio of the volume flow rate of liquid hydrocarbon-containing feedstock to the volume of catalyst loaded in the reaction unit utilizing the hydrotreatment process according to the invention. The reaction unit carrying out the process for the hydrotreatment of said gasoil cut according to the invention is preferably operated in a fixed bed, a moving bed or an ebullating bed, preferably in a fixed bed.

According to a second method of use, said hydrotreatment and/or hydrocracking process according to the invention is a process for hydrotreatment (in particular hydrodesulphurization, hydrodenitrogenation, hydrogenation of aromatics) and/or hydrocracking of a vacuum distillate cut carried out in the presence of at least one catalyst according to the invention. Said hydrotreatment and/or hydrocracking process, otherwise called process of hydrocracking pre-treatment or hydrocracking according to the invention, aims, depending on the case, to remove the sulphur-containing, nitrogen-containing or aromatic compounds present in said distillate cut so as to carry out a pre-treatment prior to conversion in catalytic cracking or hydroconversion processes, or for hydrocracking the distillate cut, which would optionally have been pre-treated beforehand if required.

Very varied feedstocks can be treated by the processes for the hydrotreatment and/or hydrocracking of vacuum distillates described above. Generally they contain at least 20% volume and often at least 80% volume of compounds boiling above 340° C. at atmospheric pressure. The feedstock may be for example vacuum distillates as well as feedstocks originating from units for extracting aromatics from lubricating oil bases or originating from solvent dewaxing of lubricating oil bases, and/or of deasphalted oils, or the feedstock may be a deasphalted oil or paraffins originating from the Fischer-Tropsch process or any mixture of the feedstocks mentioned above. In general, the feedstocks have a T5 boiling point greater than 340° C. at atmospheric pressure, and better still greater than 370° C. at atmospheric pressure, i.e. 95% of the compounds present in the feedstock have a boiling point greater than 340° C., and better still greater than 370° C. The nitrogen content of the feedstocks treated in the processes according to the invention is usually greater than 200 ppm by weight, preferably comprised between 500 and 10,000 ppm by weight. The sulphur content of the feedstocks treated in the processes according to the invention is usually comprised between 0.01 and 5.0% by weight. The feedstock may optionally contain metals (for example nickel and vanadium). The asphaltenes content is generally less than 3,000 ppm by weight.

The hydrotreatment and/or hydrocracking catalyst is generally brought into contact, in the presence of hydrogen, with the feedstocks described above, at a temperature greater than 200° C., often comprised between 250° C. and 480° C., advantageously comprised between 320° C. and 450° C., preferably between 330° C. and 435° C., at a pressure greater than 1 MPa, often comprised between 2 and 25 MPa, preferably between 3 and 20 MPa, the space velocity being comprised between 0.1 and 20.0 h$^{-1}$ and preferably 0.1-6.0 h$^{-1}$, preferably 0.2-3.0 h$^{-1}$, and the quantity of hydrogen introduced is such that the volume ratio liter of hydrogen/liter of hydrocarbon, expressed as volume of hydrogen, measured under standard conditions of temperature and pressure, per volume of liquid feedstock, is comprised between 80 and 5,000 l/l and most often between 100 and 2,000 l/l.

These operating conditions used in the processes according to the invention generally make it possible to reach conversions per pass, in products having boiling points of less than 340° C. at atmospheric pressure, and better still less than 370° C. at atmospheric pressure, greater than 15% and even more preferably comprised between 20 and 95%.

The processes for the hydrotreatment and/or hydrocracking of vacuum distillates utilizing the catalysts according to the invention cover the ranges of pressure and of conversion ranging from mild hydrocracking to high-pressure hydrocracking. By mild hydrocracking is meant hydrocracking leading to moderate conversions, generally less than 40%, and operating at low pressure, generally between 2 MPa and 6 MPa.

The catalyst according to the invention may be used alone, in a single or in several catalyst beds in fixed-bed mode, in one or more reactors, in a so-called one-step hydrocracking system, with or without liquid recycling of the unconverted fraction, or in a so-called two-step hydrocracking system, optionally in combination with a hydrorefining catalyst located upstream of the catalyst of the present invention.

According to a third method of use, said hydrotreatment and/or hydrocracking process according to the invention is advantageously used as pre-treatment in a fluidized-bed catalytic cracking process (or FCC process for Fluid Catalytic Cracking). The operating conditions of the pre-treatment in terms of temperature range, pressure range, hydrogen recycle ratio, and hourly space velocity are generally identical to those described above for the processes for the hydrotreatment and/or hydrocracking of vacuum distillates. The FCC process may be carried out conventionally as known to a person skilled in the art under suitable cracking conditions in order to produce hydrocarbon-containing products of lower molecular weight. A brief description of catalytic cracking will be found for example in ULLMANS ENCYCLOPEDIA OF INDUSTRIAL CHEMISTRY VOLUME A 18, 1991, pages 61 to 64.

According to a fourth method of use, said hydrotreatment and/or hydrocracking process according to the invention is a process for the hydrotreatment (in particular hydrodesulphurization) of a gasoline cut in the presence of at least one catalyst according to the invention.

In contrast to other hydrotreatment processes, the hydrotreatment (in particular hydrodesulphurization) of gasolines must make it possible to meet two contradictory requirements: to ensure deep hydrodesulphurization of the gasolines and to limit the hydrogenation of the unsaturated compounds present, in order to limit the loss of octane number.

The feedstock is generally a hydrocarbon cut having a distillation range comprised between 30 and 260° C. Preferably, this hydrocarbon cut is a cut of the gasoline type. Very preferably, the gasoline cut is an olefinic gasoline cut originating for example from a catalytic cracking unit (Fluid Catalytic Cracking).

The hydrotreatment process consists of bringing the hydrocarbon cut into contact with the catalyst according to the invention and hydrogen under the following conditions: at a temperature comprised between 200 and 400° C., preferably comprised between 230 and 330° C., at a total pressure comprised between 1 and 3 MPa, preferably comprised between 1.5 and 2.5 MPa, at an hourly space velocity (HSV), defined as the volume flow rate of feedstock with respect to the volume of catalyst, comprised between 1 and 10 h$^{-1}$, preferably comprised between 2 and 6 h$^{-1}$ and at a hydrogen/gasoline feedstock volume ratio comprised between 100 and 600 Nl/l, preferably comprised between 200 and 400 Nl/l.

The process for the hydrotreatment of the gasolines may be carried out in one or more reactors in series of the fixed bed type or of the ebullating bed type. If the process is carried out by means of at least two reactors in series, it is possible to provide a device for removing $H_2S$ from the effluent originating from the first hydrodesulphurization reactor before treating said effluent in the second hydrodesulphurization reactor.

The examples given below demonstrate the significantly increased activity on the catalysts prepared by the process according to the invention with respect to the catalysts of the prior art and explain the invention but without however limiting its scope.

EXAMPLES

Example 1

Preparation of the CoMoP Catalysts on Alumina without Organic Compound C1 and C2 (not According to the Invention)

Cobalt, molybdenum and phosphorus are added to an alumina support having a BET surface area of 230 m²/g, a pore volume obtained by mercury porosimetry of 0.78 ml/g and an average diameter of the pores of 11.5 nm defined as the median diameter by volume by mercury porosimetry and which is in the form of "extrudate". The impregnating solution is prepared by dissolving molybdenum oxide (24.34 g) and cobalt hydroxide (5.34 g) at 90° C. in 7.47 g of an 85% solution of phosphoric acid in water. After dry impregnation, the extrudates are left to mature in a water-saturated atmosphere for 12 h at ambient temperature, then they are dried at 90° C. for 16 hours. The dried catalyst precursor thus obtained is denoted C1. Calcining the catalyst precursor C1 at 450° C. for 2 hours results in the calcined catalyst C2. The final composition of catalysts C1 and C2 expressed in the form of oxides and referenced to the mass of dry catalyst is then as follows: $MoO_3$=22.5±0.2% by weight, CoO=4.1±0.1% by weight and $P_2O_5$=4.0±0.1% by weight.

Example 2

Preparation of the CoMoP Catalysts on Alumina C3 and C4 (not According to the Invention), C5 and C6 (According to the Invention) by Co-impregnation Cobalt, molybdenum and phosphorus are added to the alumina support described above in Example 1, which is in the form of "extrudate". The impregnating solution is prepared by dissolving molybdenum oxide (28.13 g) and cobalt hydroxide (6.62 g) at 90° C. in 7.88 g of an 85% solution of phosphoric acid in water. After homogenizing the above mixture, 37.79 g of citric acid was added before adjusting the solution volume to the pore volume of the support by adding water. The (citric acid)/Mo molar ratio is equal to 1 mol/mol and the (citric acid)/Co molar ratio is equal to 2.8 mol/mol. After dry impregnation, the extrudates are left to mature in a water-saturated atmosphere for 12 h at ambient temperature, and then they are dried at 120° C. for 16 hours. The dried catalyst precursor thus obtained is denoted C3. The final composition of catalyst C3, expressed in the form of oxides and referenced to the mass of dry catalyst, is then as follows: $MoO_3$=22.7±0.2% by weight, CoO=4.2±0.1% by weight and $P_2O_5$=3.8±0.1% by weight.

The catalyst C4 is prepared in a similar way to the catalyst C3, but after homogenizing the metallic solution containing cobalt, molybdenum and phosphorus, triethylene glycol (TEG) is added, once again in a proportion of 1 mole per mole of molybdenum or 2.8 moles per mole of cobalt. The catalyst C4 was left to mature in a water-saturated atmosphere for 12 hours at ambient temperature, and then dried at 120° C. for 16 hours. The final composition of the catalyst C4, expressed in the form of oxides and referenced to the mass of dry catalyst, is then as follows: $MoO_3$=22.6±0.2% by weight, CoO=4.1±0.1% by weight and $P_2O_5$=3.9±0.1% by weight.

The catalysts C5 and C6 according to the invention are prepared as follows. Cobalt, molybdenum and phosphorus are added to the alumina support described in Example 1, which is in the form of "extrudate". An impregnating solution was prepared by dissolving molybdenum oxide (78.75 g) and cobalt hydroxide (18.54 g) at 90° C. in 22.08 g of an 85% solution of phosphoric acid in water. After homogenizing the above mixture, γ-valerolactone was added to the solution, in equimolar proportions with respect to the molybdenum, i.e. 2.8 moles per mole of cobalt, resulting in the catalyst C5. In the same way, 4-hydroxyvaleric acid was added to the solution, in equimolar proportions with respect to the molybdenum, i.e. 2.8 moles per mole of cobalt, resulting in the catalyst C6. The volume of the solution was adjusted to the pore volume of the support by adding water before each impregnation. After dry impregnation, the extrudates of the two catalysts were left to mature in a water-saturated atmosphere for 12 hours at ambient temperature, and then dried at 120° C. for 16 hours. The final composition of the catalyst C5 expressed in the form of oxides and referenced to the mass of dry catalyst is then as follows: $MoO_3$=22.4±0.2% by weight, CoO=4.0±0.1% by weight and $P_2O_5$=4.0±0.1% by weight. The final composition of the catalyst C6 expressed in the form of oxides and referenced to the mass of dry catalyst is then as follows: $MoO_3$=22.3±0.2% by weight, CoO=3.8±0.1% by weight and $P_2O_5$=4.2±0.1% by weight.

Example 3

Preparation of the CoMoP Catalyst on Alumina C7 (According to the Invention) by Pre-impregnation 24.7 g of γ-valerolactone diluted in water, so as to obtain a solution with a total volume equal to the pore volume of the support, is added to the alumina support described above in Example 1, which is in the form of "extrudate". The solution thus formed is then dry-impregnated on the support before observing a maturation time of 3 hours in a water-saturated atmosphere at ambient temperature, followed by drying at 120° C. for 2 hours. The modified support is then impregnated with a fresh impregnating solution prepared by hot dissolution of molybdenum oxide (27.00 g) and cobalt hydroxide (6.36 g) in 7.57 g of an 85% solution of phosphoric acid in water, taking care to adjust the volume of this last-mentioned solution to the pore volume of the previous modified support, by adding water. After dry impregnation, the extrudates were left to mature in a water-saturated atmosphere for 3 h at ambient temperature, and then dried at 120° C. for 16 hours, to give the catalyst C7. The final composition of the catalyst C6 expressed in the form of oxides and referenced to the mass of dry catalyst is then as follows: $MoO_3$=22.5 ±0.2% by weight, CoO=4.1±0.1% by weight and $P_2O_5$=4.0±0.1% by weight.

The quantities used are such that the quantity of γ-valerolactone is one mole per mole of molybdenum and 2.8 moles per mole of cobalt.

Example 4

Preparation of the CoMoP Catalysts on Alumina C8 (not According to the Invention) and C9 (According to the Invention) by Co-impregnation (Low Organic Compound/Mo Ratio)

Cobalt, molybdenum and phosphorus are added to the alumina support described above in Example 1, which is in the form of "extrudate", as for the preparation of the catalyst C3. However, during preparation of the impregnating solution, the citric acid/molybdenum molar ratio is in this case equal to 0.25 mol/mol, or 0.70 mole of citric acid per mole of cobalt. After dry impregnation, the extrudates are left to mature in a water-saturated atmosphere for 12 hours at ambient temperature, and then they are dried at 120° C. for 16 hours. The dried catalyst precursor thus obtained is denoted C8. The final composition of the catalyst C8, expressed in the form of oxides and referenced to the mass of dry catalyst, is then as follows: $MoO_3$=22.5±0.2% by weight, CoO=4.0±0.1% by weight and $P_2O_5$=3.9±0.1% by weight.

Cobalt, molybdenum and phosphorus are added to the alumina support described above in Example 1, which is in the form of "extrudate", as for the preparation of the catalyst C5. However, during preparation of the impregnating solution, the molar ratio of γ-valerolactone to molybdenum was fixed at 0.25 mol/mol, i.e. 0.70 mole of γ-valerolactone per mole of cobalt. After dry impregnation, the extrudates were left to mature in a water-saturated atmosphere for 12 hours at ambient temperature, and then dried at 120° C. for 16 hours. The dried catalyst precursor thus obtained is denoted C9. The final composition of the catalyst C9 expressed in the form of oxides and referenced to the mass of dry catalyst is then as follows: $MoO_3$=22.3±0.2% by weight, CoO=4.1±0.1% by weight and $P_2O_5$=4.3±0.1% by weight.

Example 5

Evaluation of the Catalysts C1, C2, C3, C4 and C8 (not According to the Invention) and C5, C6, C7 and C9 (According to the Invention) in the HDS of Gasoil The catalysts C1, C2, C3, C4 and C8 (not according to the invention) and C5, C6, C7 and C9 (according to the invention) were tested in the HDS of gasoil.

Characteristics of the gasoil feedstock used: density at 15° C.: 0.8522 g/cm³, sulphur: 1.44% by weight.

Simulated Distillation:

| IBP | 155° C. |
|---|---|
| 10% | 247° C. |
| 50% | 315° C. |
| 90% | 392° C. |
| FBP | 444° C. |

The test is carried out in an isothermal pilot reactor with transversed fixed bed, with the fluids circulating from bottom to top. After sulphurization in situ at 350° C. in the unit under pressure by means of the gasoil for the test, to which 2% by weight of dimethyl disulphide is added, the hydrodesulphurization test was carried out under the following operating conditions: total pressure of 7 MPa, catalyst volume of 30 cm³, temperature from 330 to 360° C., hydrogen flow rate of 24 l/h and feedstock flow rate of 60 cm³/h.

The catalytic performances of the catalysts tested are shown in Table 1. They are is expressed in degrees Celsius based on a comparative catalyst selected as reference (C2): they correspond to the temperature difference to be applied to achieve 50 ppm of sulphur in the effluent. A negative value indicates that the target sulphur content is reached for a lower temperature and that there is therefore a gain of activity. A positive value means that the target sulphur content is reached for a higher temperature and that there is therefore a loss of activity. The results obtained are presented in Table 1.

Table 1 clearly shows the gain in catalytic effect provided by γ-valerolactone, but also by 4-hydroxyvaleric acid. In fact, the catalysts C5, C6 and C7 (according to the invention) have activities greater than those obtained for all the other catalysts evaluated for the same molar proportions of organic compound (1 mol/mol$_{Mo}$).

The gain is also maximized, for the same quantity of additive; the catalysts C5 and C6 are more active than the catalysts C3 and C4 respectively obtained with citric acid or TEG which are less active.

The activity of the catalyst C7 is still far higher than that of the base catalyst C2 or of a dried catalyst C1 without γ-valerolactone or 4-hydroxyvaleric acid.

The advantage of the catalyst according to the invention is still significant at a lower proportion of organic compound, as shown by the catalyst C9, which thus has an intrinsic effectiveness of γ-valerolactone greater than that of the other compounds, for which it is necessary to introduce a higher proportion of compound in order to observe a significant catalytic effect.

TABLE 1

Relative activity at iso-volume of the catalysts C1, C2, C3, C4 and C8 (not according to the invention) and C5, C6, C7 and C9 (according to the invention) with respect to the catalyst C2 (not according to the invention), in the hydrodesulphurization of gasoil

| Catalyst (comparative or according to the invention) | Organic compound used and molar ratio/Mo | Method of introducing the organic compound (post-/co-/pre-impregnation) | Heat treatment | HDS activity |
|---|---|---|---|---|
| C1 (comp) | none | N/A | Dried 120° C. | Base + 1.1° C. |
| C2 (comp) | none | N/A | Calcined | Base |
| C3 (comp) | Citric acid-1.0 | CO | Dried 120° C. | Base − 3.1° C. |
| C4 (comp) | TEG-1.0 | CO | Dried 120° C. | Base − 5.3° C. |
| C5 (inv) | γ-valerolactone-1.0 | CO | Dried 120° C. | Base − 7.3° C. |
| C6 (inv) | 4-hydroxyvaleric acid-1.0 | CO | Dried 120° C. | Base − 6.8° C. |
| C7 (inv) | γ-valerolactone-1.0 | PRE | Dried 120° C. | Base − 6.2° C. |
| C8 (comp) | Citric acid-0.25 | CO | Dried 120° C. | Base − 2.2° C. |
| C9 (inv) | γ-valerolactone-0.25 | CO | Dried 120° C. | Base − 4.4° C. |

The invention claimed is:

1. A catalyst comprising a support based on alumina or silica or silica-alumina, at least one element of group VIII, at least one element of group VIB, at least one additive that is γ-valerolactone, 4-hydroxyvaleric acid, 2-pentenoic acid, 3-pentenoic acid or 4-pentenoic acid, and phosphorus, the phosphorus content being 0.1 to 20% by weight expressed as $P_2O_5$ with respect to the total weight of the catalyst and the ratio of phosphorus to the element of group VIB in the catalyst is greater than or equal to 0.05.

2. The catalyst according to claim 1, having a content of the element of group VIB of 5 to 40% by weight expressed as oxide of the metal of group VIB with respect to the total weight of the catalyst and a content of the element of group VIII of 1 to 10% by weight expressed as oxide of the metal of group VIII with respect to the total weight of the catalyst.

3. The catalyst according to claim 1, having a molar ratio of the element of group VIII to the element of group VIB in the catalyst of 0.1 to 0.8.

4. The catalyst according to claim 1, having a total content of additive(s) γ-valerolactone, 4-hydroxyvaleric acid, 2-pentenoic acid, 3-pentenoic acid, or 4-pentenoic acid of 1 to 35% by weight with respect to the total weight of the catalyst.

5. The catalyst according to claim 1, which additionally contains an organic compound other than the additive γ-valerolactone, 4-hydroxyvaleric acid, 2-pentenoic acid, 3-pentenoic acid or 4-pentenoic acid, said organic compound containing oxygen and/or nitrogen and/or sulphur.

6. The catalyst according to claim 5, in which the organic compound is a compound comprising one or more of a carboxyl, alcohol, thiol, thioether, sulphone, sulphoxide, ether, aldehyde, ketone, ester, carbonate, amine, nitrile, imide, oxime, urea or amide functions.

7. The catalyst according to claim 6, in which the organic compound is triethylene glycol, diethylene glycol, ethylenediaminetetraacetic acid, maleic acid, citric acid, dimethylformamide, bicine, or tricine.

8. The catalyst according to claim 1, in which the support contains from 0.1 to 50% by weight of zeolite.

9. The catalyst according to claim 1, that is at least partially sulphurized.

10. A process for the hydrotreatment and/or hydrocracking of hydrocarbon-containing cuts, comprising subjecting said cuts to hydrotreatment and/or hydrocracking, conditions in the presence of a catalyst according to claim 1.

11. A process for the preparation of a catalyst according to claim 1 comprising:
    a) bringing at least one component of an element of group VIB, at least one component of an element of group VIII, at least one additive that is γ-valerolactone, 4-hydroxyvaleric acid, 2-pentenoic acid, 3-pentenoic acid or 4-pentenoic acid and phosphorus into contact with a support based on alumina or silica or silica-alumina, or bringing a regenerated catalyst containing a support based on alumina or silica or silica-alumina, at least one component of an element of group VIB, at least one component of an element of group VIII and phosphorus into contact with at least one additive γ-valerolactone, 4-hydroxyvaleric acid, 2-pentenoic acid, 3-pentenoic acid or 4-pentenoic acid, so as to obtain a catalyst precursor,
    b) drying said catalyst precursor originating from a) at a temperature of less than 200° C., without calcining it subsequently.

12. The process according to claim 11, in which a) comprises the following:

a') impregnating a support based on alumina or silica or silica-alumina with at least one solution containing at least one element of group VIB, at least one element of group VIII, at least one additive that is γ-valerolactone, 4-hydroxyvaleric acid, 2-pentenoic acid, 3-pentenoic acid or 4-pentenoic acid and phosphorus so as to obtain a catalyst precursor.

13. The process according to claim 11, in which a) comprises the following:
- a1) impregnating a support based on alumina or silica or silica-alumina with at least one solution containing at least one element of group VIB, at least one element of group VIII and phosphorus in order to obtain an impregnated support,
- a2) drying the impregnated support obtained in a1) at a temperature of less than 200° C. in order to obtain a dried impregnated support, and calcining the dried impregnated support in order to obtain a calcined impregnated support,
- a3) impregnating the dried and optionally calcined impregnated support obtained in a2) with an impregnating solution comprising at least one additive that is γ-valerolactone, 4-hydroxyvaleric acid, 2-pentenoic acid, 3-pentenoic acid or 4-pentenoic acid so as to obtain a catalyst precursor,
- a4) optionally, leaving the catalyst precursor obtained in a3) to mature.

14. The process according to claim 11, in which a) comprises the following:
- a1') preparing a support comprising at least one additive that is γ-valerolactone, 4-hydroxyvaleric acid, 2-pentenoic acid, 3-pentenoic acid or 4-pentenoic acid and at least one part of phosphorus,
- a2') impregnating the support obtained in a1') with an impregnating solution comprising at least one element of group VIB, at least one element of group VIII and phosphorus so as to obtain a catalyst precursor,
- a3') optionally, leaving the catalyst precursor obtained in a2') to mature.

15. The process according to claim 11, in which a) comprises the following:
- a1") by co-impregnation, bringing a solution containing at least one element of group VIB, at least one element of group VIII, at least one organic compound containing oxygen and/or nitrogen and/or sulphur, and phosphorus into contact with a support based on alumina or silica or silica-alumina so as to obtain an impregnated support,
- a2") drying the impregnated support originating from step a1") at a temperature of less than 200° C., without calcining it subsequently, in order to obtain a dried impregnated support,
- a3") bringing the dried impregnated support originating from step a2") into contact with a solution of an organic compound containing oxygen and/or nitrogen and/or sulphur, identical to or different from that used in step a1"), so as to obtain a catalyst precursor,
- a4") optionally, leaving the catalyst precursor obtained in step a3") to mature, and at least one of the organic compounds in step a1") or in a3") is γ-valerolactone, 4-hydroxyvaleric acid, 2-pentenoic acid, 3-pentenoic acid or 4-pentenoic acid.

16. The process according to claim 11, in which a) comprises the following:
- a1''') impregnating a regenerated catalyst containing a support based on alumina or silica or silica-alumina, at least one component of an element of group VIB, at least one component of an element of group VIII and phosphorus with an impregnating solution comprising at least one additive that is γ-valerolactone, 4-hydroxyvaleric acid, 2-pentenoic acid, 3-pentenoic acid or 4-pentenoic acid so as to obtain a catalyst precursor,
- a2''') optionally, leaving the catalyst precursor obtained in a1''') to mature.

17. The process according to claim 11, in which the total molar ratio of the γ-valerolactone, 4-hydroxyvaleric acid, 2-pentenoic acid, 3-pentenoic acid or 4-pentenoic acid additive(s) to the element(s) of group VIII is 0.1 to 5.0 mol/mol.

* * * * *